US011736639B2

(12) United States Patent
Kawaoka et al.

(10) Patent No.: US 11,736,639 B2
(45) Date of Patent: Aug. 22, 2023

(54) SHEET CONVEYING DEVICE, IMAGE PROCESSING APPARATUS, AND SHEET CONVEYING METHOD

(71) Applicant: KYOCERA Document Solutions Inc., Osaka (JP)

(72) Inventors: Ryo Kawaoka, Osaka (JP); Tadaharu Kusumi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/655,767

(22) Filed: Mar. 21, 2022

(65) Prior Publication Data

US 2022/0311874 A1    Sep. 29, 2022

(30) Foreign Application Priority Data

Mar. 25, 2021 (JP) .................. 2021-051526

(51) Int. Cl.
*H04N 1/00* (2006.01)
*G03G 15/00* (2006.01)

(52) U.S. Cl.
CPC ....... *H04N 1/0062* (2013.01); *G03G 15/6529* (2013.01); *H04N 1/00588* (2013.01); *H04N 1/00631* (2013.01); *H04N 1/00657* (2013.01)

(58) Field of Classification Search
CPC .. B65H 1/14; B65H 2511/20; B65H 2801/06; B65H 3/48; B65H 7/02; B65H 2220/01; B65H 2220/02; B65H 3/128; B65H 7/20; B65H 2405/15; B65H 2801/27; B65H 1/08; B65H 2511/15; B65H 2511/51; B65H 2511/22; B65H 7/04; B65H 1/025; B65H 1/04; B65H 1/266; B65H 2220/11; B65H 2404/63; B65H 2511/11; B65H 2511/30; B65H 2511/414; B65H 2513/40; B65H 29/52; B65H 3/06; B65H 45/18; B65H 2553/61; B65H 3/0669; B65H 3/0684;

(Continued)

(56) References Cited

U.S. PATENT DOCUMENTS 4,130,206 A * 12/1978 Buccicone ............. B65H 29/30
271/223
5,152,520 A * 10/1992 Farrell ................... B65H 1/266
271/147

(Continued)

FOREIGN PATENT DOCUMENTS

JP        2005015122 A     1/2005

*Primary Examiner* — Negussie Worku
(74) *Attorney, Agent, or Firm* — Alleman Hall Creasman & Tuttle LLP

(57) ABSTRACT

A sheet conveying device includes a sheet placement table, a sheet discharge table, a conveyance mechanism, raising/lowering mechanism, and a raising/lowering control portion. The sheet discharge table is located below the sheet placement table. The conveyance mechanism conveys a sheet placed on the sheet placement table onto the sheet discharge table via an execution position at which image processing is executed by an image processing portion. The raising/lowering mechanism raises and lowers the sheet placement table. The raising/lowering control portion controls the raising/lowering mechanism to raise and lower the sheet placement table to a target position that is determined in accordance with a size of the sheet on the sheet discharge table.

11 Claims, 5 Drawing Sheets

(58) Field of Classification Search
CPC .......... B65H 31/02; B65H 37/04; B65H 1/18; B65H 2220/03; B65H 2301/4213; B65H 2301/43828; B65H 2301/45; B65H 2402/60; B65H 2403/512; B65H 2404/1112; B65H 2404/141; B65H 2405/353; B65H 2408/121; B65H 2511/10; B65H 2511/12; B65H 2511/222; B65H 2511/515; B65H 2515/10; B65H 2515/20; B65H 2551/26; B65H 2701/18292; B65H 31/10; B65H 37/06; B65H 2301/512125; B65H 2404/7231; B65H 2405/1117; B65H 2406/323; B65H 2511/212; B65H 2511/52; B65H 2513/512; B65H 2801/03; B65H 2801/21; B65H 3/0607; B65H 3/56; B65H 43/02; B65H 5/34; B65H 7/06; B65H 9/006; B65H 9/04; B65H 2220/04; B65H 2220/09; B65H 2301/4212; B65H 2301/42146; B65H 2403/544; B65H 2403/946; B65H 2404/1114; B65H 2404/1321; B65H 2404/1441; B65H 2404/1521; B65H 2404/5311; B65H 2404/623; B65H 2404/693; B65H 2405/10; B65H 2405/11151; B65H 2405/11164; B65H 2405/12; B65H 2405/211; B65H 2405/214; B65H 2405/313; B65H 2405/331; B65H 2405/3321; B65H 2511/18; B65H 2511/216; B65H 2511/417; B65H 2511/514; B65H 2511/528; B65H 2513/51; B65H 2553/00; B65H 2601/26; B65H 2601/321; B65H 2701/1131; B65H 2701/1311; B65H 2701/1313; B65H 29/246; B65H 3/08; B65H 31/08; B65H 31/18; B65H 31/20; B65H 31/3027; B65H 31/36; B65H 31/38; B65H 33/08; B65H 5/00; B65H 5/062; B65H 7/00; B65H 7/08; B65H 7/16; B65H 7/18; B65H 9/00; B65H 1/24; B65H 1/26; B65H 11/00; B65H 2403/72; B65H 2403/73; B65H 2404/152; B65H 2405/1134; B65H 2407/10; B65H 2407/21; B65H 2513/10; B65H 2513/50; B65H 2513/52; B65H 2553/80; B65H 2601/125; B65H 2601/521; B65H 2601/524; B65H 3/0638; B65H 3/14; B65H 3/34; B65H 3/44; B65H 3/446; B65H 3/565; B65H 31/04; B65H 43/08; B65H 5/068; B65H 5/26; G03G 15/6529; G03G 2215/00544; G03G 15/6541; G03G 2215/00877; G03G 15/6502; G03G 2215/00827; G03G 15/6555; G03G 15/6582; G03G 2215/00945; G03G 2221/1675; G03G 15/00; G03G 15/6544; G03G 21/1633; G03G 2215/00421; G03G 2215/00447; G03G 2221/1672; H04N 1/00535; H04N 1/00543; H04N 1/0464; H04N 1/12; H04N 1/193; H04N 1/00602; H04N 1/00615; H04N 1/00631; H04N 1/00795; H04N 2201/0094
USPC .......................................................... 358/498
See application file for complete search history.

(56) References Cited

U.S. PATENT DOCUMENTS

| | | | | |
|---|---|---|---|---|
| 2004/0041333 | A1* | 3/2004 | Izumi | G03G 15/6529 271/145 |
| 2009/0001648 | A1* | 1/2009 | Wakabayashi | B42C 1/12 270/58.12 |
| 2009/0166953 | A1* | 7/2009 | Osakabe | B65H 7/02 271/18 |
| 2014/0118753 | A1* | 5/2014 | Minakuchi | H04N 1/3875 358/1.2 |
| 2020/0361730 | A1* | 11/2020 | Kusumi | B65H 7/125 |
| 2021/0070564 | A1* | 3/2021 | Ito | B65H 1/04 |
| 2022/0055851 | A1* | 2/2022 | Ito | B65H 1/14 |
| 2022/0263961 | A1* | 8/2022 | Tokoro | H04N 1/00602 |
| 2022/0321722 | A1* | 10/2022 | Shirasaki | H04N 1/0066 |
| 2022/0321730 | A1* | 10/2022 | Tanaka | H04N 1/02418 |

* cited by examiner

SHEET CONVEYING DEVICE, IMAGE PROCESSING APPARATUS, AND SHEET CONVEYING METHOD

INCORPORATION BY REFERENCE

This application is based upon and claims the benefit of priority from the corresponding Japanese Patent Application No. 2021-051526 filed on Mar. 25, 2021, the entire contents of which are incorporated herein by reference.

BACKGROUND

The present disclosure relates to a sheet conveying device, an image processing apparatus, and a sheet conveying method.

There is known, as a related technology, a sheet conveying device that includes a sheet placement table (sheet placement tray) and a sheet discharge table (sheet discharge tray), wherein a sheet (a bundle of document sheets) before image reading is placed on the sheet placement table, the sheet discharge table is disposed below the sheet placement table, and a sheet from which an image has been read is placed on the sheet discharge table. The sheet conveying device of the related technology includes a raising/lowering mechanism and a detection means, wherein the raising/lowering mechanism raises and lowers the sheet placement table so that a space between the sheet placement table and the sheet discharge table is widened, and the detection means detects whether or not a sheet is placed on the sheet discharge table. This sheet conveying device controls the raising/lowering operation of the sheet placement table based on the detection state of the detection means. In this sheet conveying device, when the detection means detects a sheet placed on the sheet placement table after a sheet reading operation is completed, the sheet placement table is raised, thereby enhancing visibility of the sheet on the sheet placement table and urging prevention of forgetting to take out the sheet from the sheet discharge table.

SUMMARY

A sheet conveying device according to an aspect of the present disclosure includes a sheet placement table, a sheet discharge table, a conveyance mechanism, raising/lowering mechanism, and a raising/lowering control portion. The sheet discharge table is located below the sheet placement table. The conveyance mechanism conveys a sheet placed on the sheet placement table onto the sheet discharge table via an execution position at which image processing is executed by an image processing portion. The raising/lowering mechanism raises and lowers the sheet placement table. The raising/lowering control portion controls the raising/lowering mechanism to raise and lower the sheet placement table to a target position that is determined in accordance with a size of the sheet on the sheet discharge table.

An image processing apparatus according to another aspect of the present disclosure includes the sheet conveying device and the image processing portion. The image processing portion executes at least one of image reading and image forming on the sheet as a target.

A sheet conveying method according to a further aspect of the present disclosure is used in a sheet conveying device that includes a sheet placement table, a sheet discharge table, a conveyance mechanism, raising/lowering mechanism, and a raising/lowering control portion. The sheet discharge table is located below the sheet placement table. The conveyance mechanism conveys a sheet placed on the sheet placement table onto the sheet discharge table via an execution position at which image processing is executed by an image processing portion. The raising/lowering mechanism raises and lowers the sheet placement table. The sheet conveying method includes controlling the raising/lowering mechanism to raise and lower the sheet placement table to a target position that is determined in accordance with a size of the sheet on the sheet discharge table.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings. It should be noted that the following embodiments are examples of specific embodiments of the present disclosure and should not limit the technical scope of the present disclosure.

Embodiment 1

[1] Entire Configuration of Image Processing Apparatus

Figure 1:
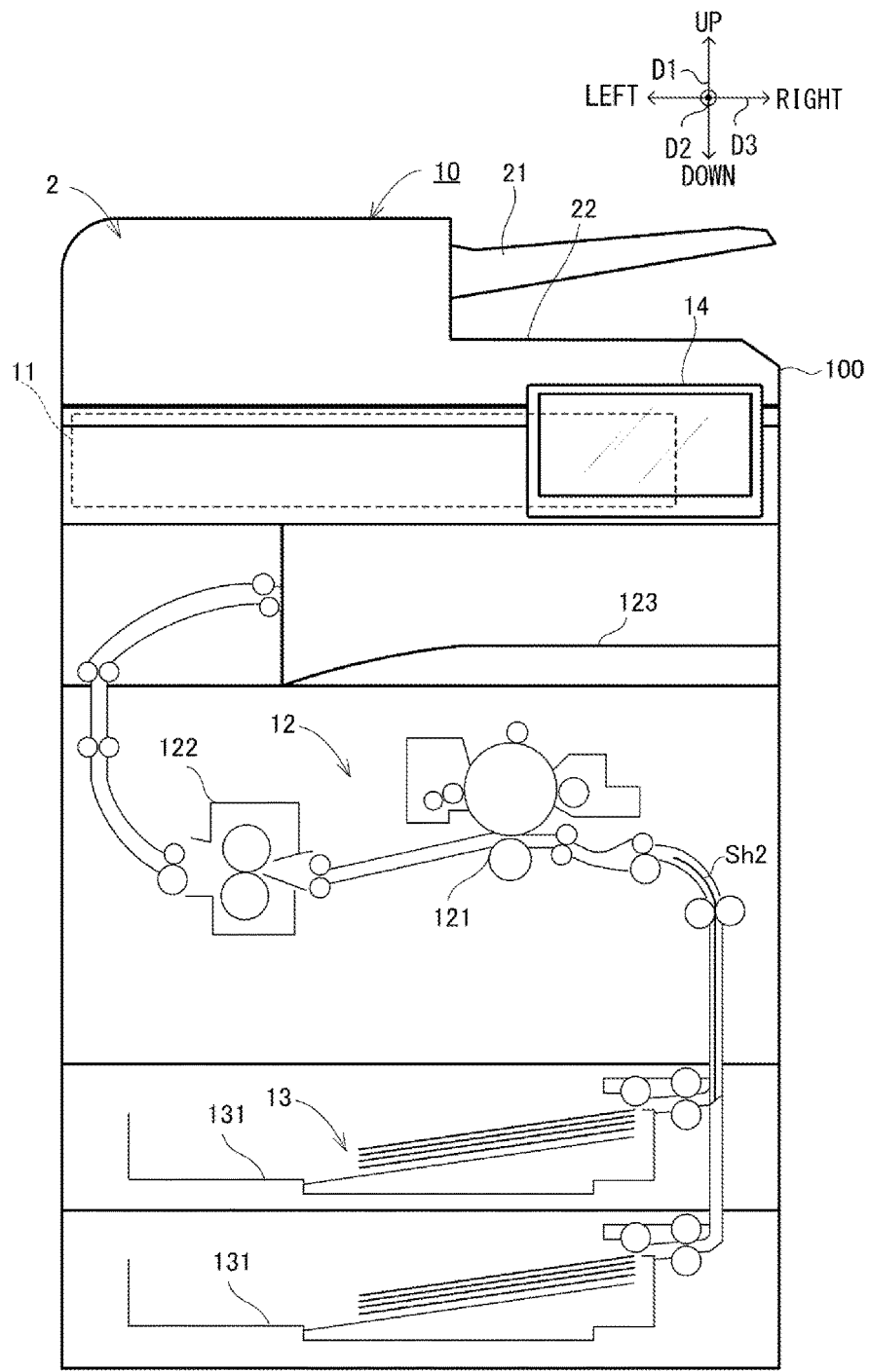
FIG. 1 is a schematic diagram showing an external appearance and an internal configuration of an image processing apparatus according to Embodiment 1.
Figure 2:
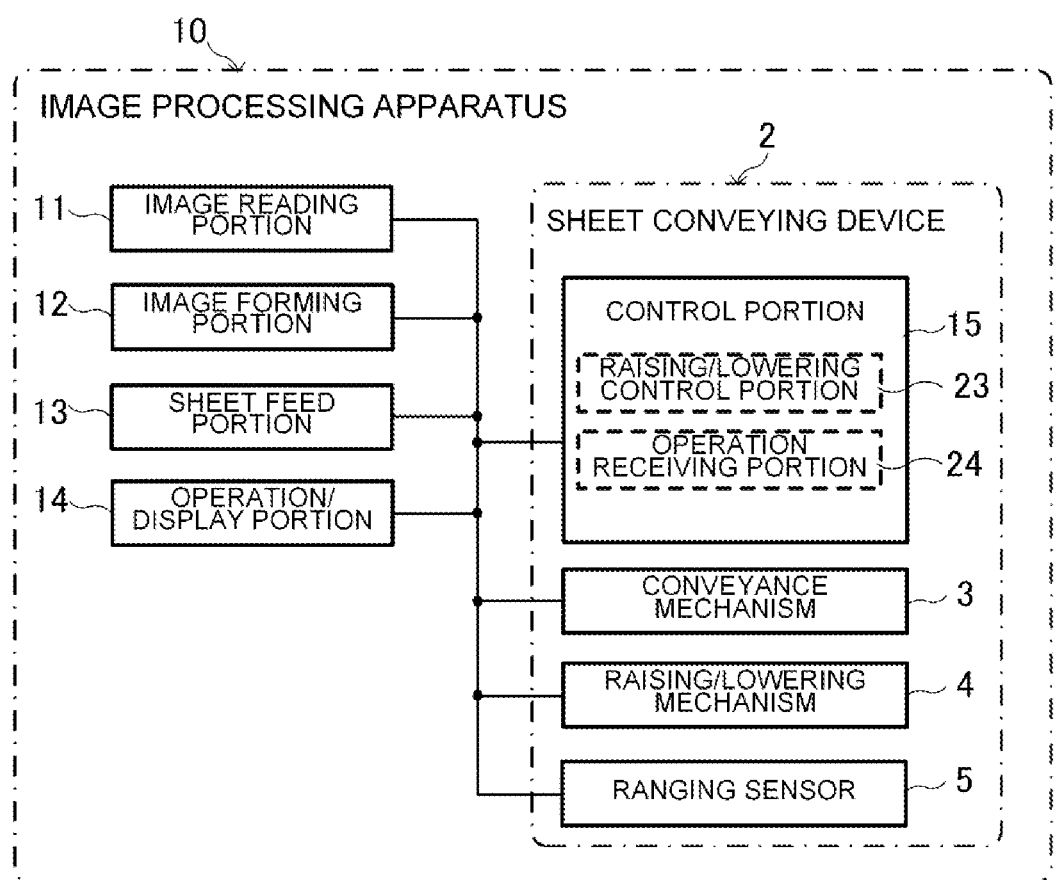
FIG. 2 is a schematic block diagram of the image processing apparatus according to Embodiment 1.

First, the following describes an entire configuration of an image processing apparatus 10 according to the present embodiment with reference to FIG. 1 and FIG. 2.

For the sake of explanation, a vertical direction in a state where the image processing apparatus 10 is usably installed (the state shown in FIG. 1), is defined as an up-down direction D1. In addition, a direction of the image processing apparatus 10 shown in FIG. 1 perpendicular to the paper surface is defined as a front-back direction D2, and a surface located on the front side in FIG. 1 is defined as a front surface. Furthermore, a left-right direction D3 is defined on the supposition that a surface on the left side in FIG. 1 is a left surface.

The image processing apparatus 10 according to the present embodiment is, for example, a multifunction peripheral having a plurality of functions such as a scan function to acquire an image (image data) from a document sheet, a print function to form an image based on image data, a facsimile function, and a copy function. The image processing apparatus 10 only needs to include an image processing function that includes at least one of a function to form an image and a function to read an image, and may be a printer, a scanner, a facsimile apparatus, or a copier.

As shown in FIG. 2, the image processing apparatus 10 includes a sheet conveying device 2, an image reading portion 11, an image forming portion 12, a sheet feed portion 13, an operation/display portion 14, and a control portion 15. In the present embodiment, as shown in FIG. 1, the image processing apparatus 10 includes a housing 100. The sheet conveying device 2, the image reading portion 11, the image forming portion 12, the sheet feed portion 13, the operation/display portion 14, and the control portion 15 are provided in the housing 100.

In the present embodiment, the sheet conveying device 2 is an auto document feeder (ADF). The sheet conveying device 2 conveys a sheet Sh1 (document sheet) as a reading target (image processing target) from which an image is read by the image reading portion 11. The sheet conveying device 2 includes a sheet placement table 21, a sheet discharge table 22, a conveyance mechanism 3, a raising/lowering mechanism 4, and a ranging sensor 5. The sheet conveying device 2 drives the conveyance mechanism 3 so that a sheet Sh1 set on the sheet placement table 21 is conveyed to the sheet discharge table 22 by passing an image reading position at which the image reading portion 11 reads an image from the sheet Sh1.

The image reading portion 11 reads an image from the sheet Sh1 (document sheet) and outputs image data corresponding to the read image. The image reading portion 11 includes a document sheet table, a light source, a plurality of mirrors, an optical lens, and a CCD (Charge Coupled Device).

The image forming portion 12 forms an image on a sheet Sh2 based on the image data output from the image reading portion 11. In addition, the image forming portion 12 forms an image on a sheet Sh2 based on image data input from an information processing apparatus, such as a personal computer, that is external to the image processing apparatus 10. In the present embodiment, as one example, as shown in FIG. 1, the image forming portion 12 includes a transfer device 121, a fixing device 122, and a sheet discharge tray 123, and forms an image on the sheet Sh2 by an electrophotographic method. Not limited to a configuration to form a monochrome image, the image forming portion 12 may have a configuration to form a full-color image by using four colors: C (cyan), M (magenta), Y (yellow), and K (black). In addition, the image forming portion 12 may have a configuration to form an image on a sheet by an image forming method, such as an ink jet method, other than the electrophotographic method.

The image forming portion 12 forms an image on a sheet Sh2 by using toner as developer. Specifically, the image forming portion 12 irradiates a laser light on an electrically charged surface of a photoconductor drum to form an electrostatic latent image thereon, and forms a toner image on the surface of the photoconductor drum by developing the electrostatic latent image by the toner. The transfer device 121 transfers the toner image to a sheet Sh2 while it is conveyed along a conveyance path. The fixing device 122 fixes the toner image that has been transferred to a sheet Sh2, to the sheet Sh2 by melting. For example, the fixing device 122 includes a fixing roller and a pressing roller, and fixes the toner image to the sheet Sh2 by heating the toner image that has been transferred to the sheet Sh2, while applying pressure to the sheet Sh2. The sheet Sh2 with the image formed thereon is discharged to the sheet discharge tray 123. In a case where the image forming portion 12 forms an image by the ink jet method, ink (another example of the developer) is supplied instead of the toner.

The sheet feed portion 13 supplies a sheet Sh2 to the image forming portion 12. The sheet feed portion 13 includes a plurality of sheet feed cassettes 131, a manual feed tray, and a plurality of conveyance rollers. The sheet feed portion 13 feeds a sheet Sh2 from the plurality of sheet feed cassettes 131 or the manual feed tray, and the sheet Sh2 is conveyed along a conveyance path by the plurality of conveyance rollers to be supplied to the image forming portion 12. The image forming portion 12 forms an image on the sheet Sh2 supplied from the sheet feed portion 13 along the conveyance path.

The operation/display portion 14 is a user interface in the image processing apparatus 10. The operation/display portion 14 includes a display portion and an operation portion, wherein the display portion is, for example, a liquid crystal display that displays various types of information in accordance with a control instruction from the control portion 15, and the operation portion is, for example, a switch or a touch panel that inputs various types of information to the control portion 15 in accordance with a user operation. In addition, the image processing apparatus 10 may include, as user interfaces, an audio output portion and an audio input portion for example in addition to or in place of the operation/display portion 14. In addition, the operation/display portion 14 may be, for example, an external device that is provided independently of the housing 100. In this case, the image processing apparatus 10 can use the operation/display portion 14 as a user interface by performing a data communication with the external device.

The control portion 15 comprehensively controls the image processing apparatus 10. A main configuration of the control portion 15 is a computer system that includes one or more processors and one or more memories. In the image processing apparatus 10, the functions of the control portion 15 are realized when the one or more processors execute programs. The programs may be preliminarily recorded on the one or more memories, may be provided via an electric communication line such as the Internet, or maybe provided in a state of being recorded on a non-transitory recording medium, such as a memory card or an optical disc, that can be read by a computer system. The one or more processors are composed of one or more electronic circuits including a semiconductor integrated circuit. Furthermore, the computer system referred to in the present disclosure includes a micro controller that includes one or more processors and one or more memories. The control portion 15 may be a control portion that is provided independently of a main control portion that comprehensively controls the image processing apparatus 10.

In addition, the image processing apparatus 10 further includes a storage portion, a communication portion, and a power source portion. The storage portion includes one or more nonvolatile memories, and preliminarily stores information, such as control programs, for causing the control portion 15 to execute various types of processing. The communication portion is an interface configured to execute a data communication between the image processing apparatus 10 and, for example, an external apparatus that is connected therewith via a communication network such as the Internet or a LAN (Local Area Network). The power source portion is a power source circuit configured to generate (output) an electric power for operating the image processing apparatus 10.

Here, the sheet conveying device 2 of the present embodiment constitutes the image processing apparatus 10 together with an image processing portion (the image reading portion 11 and the image forming portion 12). In other words, the sheet conveying device 2 of the present embodiment includes the sheet conveying device 2 and an image processing portion that executes at least one of image reading and image forming on the sheet Sh1 as a target.

[2] Sheet Conveying Device

Next, the following describes a configuration of the sheet conveying device 2 according to the present embodiment in more detail with reference to FIG. 1 to FIG. 5.

The sheet conveying device 2 is configured to convey a sheet Sh1 from the sheet placement table 21 to the sheet discharge table 22. Here, the "sheet" of the present disclosure is a target of image reading or a target of image forming. As one example, in the present embodiment, a sheet Sh1 as a target of conveyance by the sheet conveying device 2 is a sheet Sh1 (document sheet) as a target of image reading by the image reading portion 11. That is, in the present embodiment, the sheet conveying device 2 conveys a sheet Sh1 placed on the sheet placement table 21 onto the sheet discharge table 22 via an execution position P1 (see FIG. 3) at which image processing (image reading) is executed by the image reading portion 11 as an image processing portion. Accordingly, the position at which the image is read by the image reading portion 11 corresponds to the execution position P1. In addition, in the present embodiment, the sheet Sh1 is paper as one example. However, the sheet Sh1 is not limited to paper, but may be, for example, a resin film.

In the present embodiment, in addition to the sheet placement table 21, the sheet discharge table 22, the conveyance mechanism 3, the raising/lowering mechanism 4, and the ranging sensor 5, the sheet conveying device 2 includes a raising/lowering control portion 23 and an operation receiving portion 24. The raising/lowering control portion 23 and the operation receiving portion 24 are provided in the control portion 15 each as a function of the control portion 15. That is, in the present embodiment, the image processing apparatus 10 is provided with the raising/lowering control portion 23 and the operation receiving portion 24 included in the sheet conveying device 2, as functions of the control portion 15.

The sheet placement table 21 is a member on which a sheet Sh1 as a target of conveyance by the sheet conveying device 2 is placed. In the present embodiment, a sheet Sh1 conveyed by the sheet conveying device 2 is a sheet Sh1 (document sheet) as a target of image reading by the image reading portion 11. As a result, a sheet Sh1 set on an upper surface of the sheet placement table 21 is a sheet Sh1 before image reading by the image reading portion 11.

Here, sheets Sh1 of various sizes (paper sizes), such as A3E (A3 lateral size), B4E (B4 lateral size), 2L print size, L print size, postcard, or business card, can be set on the sheet placement table 21. The sheet placement table 21 includes a pair of cursors that face each other in the front-back direction D2, and the distance between the pair of cursors is adjusted in accordance with a size of the sheet Sh1 set on the sheet placement table 21 in a lateral direction (in this case, the front-back direction D2) that is perpendicular to a longitudinal direction (conveyance direction) of the sheet Sh1.

One or more sheets Sh1, as a target of conveyance by the sheet conveying device 2, are set on the sheet placement table 21 in a state of being placed thereon. When a plurality of sheets Sh1 are set on the sheet placement table 21, the plurality of sheets Sh1 are placed on the sheet placement table 21 in a state of being overlaid in the up-down direction D1, namely, in a state of being stacked.

The sheet discharge table 22 is a member on which a sheet Sh1 that has been conveyed by the sheet conveying device 2 is placed. The sheet discharge table 22 is located below the sheet placement table 21. The sheet conveying device 2 conveys a sheet Sh1 placed on the sheet placement table 21 to pass the execution position P1 at which the image processing is executed by the image processing portion, and discharges the sheet Sh1 onto the sheet discharge table 22. In the present embodiment, since a sheet Sh1 conveyed by the sheet conveying device 2 is a sheet Sh1 (document sheet) as a target of image reading by the image reading portion 11, a sheet Sh1 from which an image has been read by the image reading portion 11 is discharged onto an upper surface of the sheet discharge table 22.

Here, as is the case with the sheet placement table 21, sheets Sh1 of various sizes (paper sizes) can be placed on the sheet discharge table 22. Furthermore, as is the case with the sheet placement table 21, when a plurality of sheets Sh1 are discharged onto the sheet discharge table 22, the plurality of sheets Sh1 are placed on the sheet discharge table 22 in a state of being overlaid in the up-down direction D1, namely, in a state of being stacked.

Figure 3:
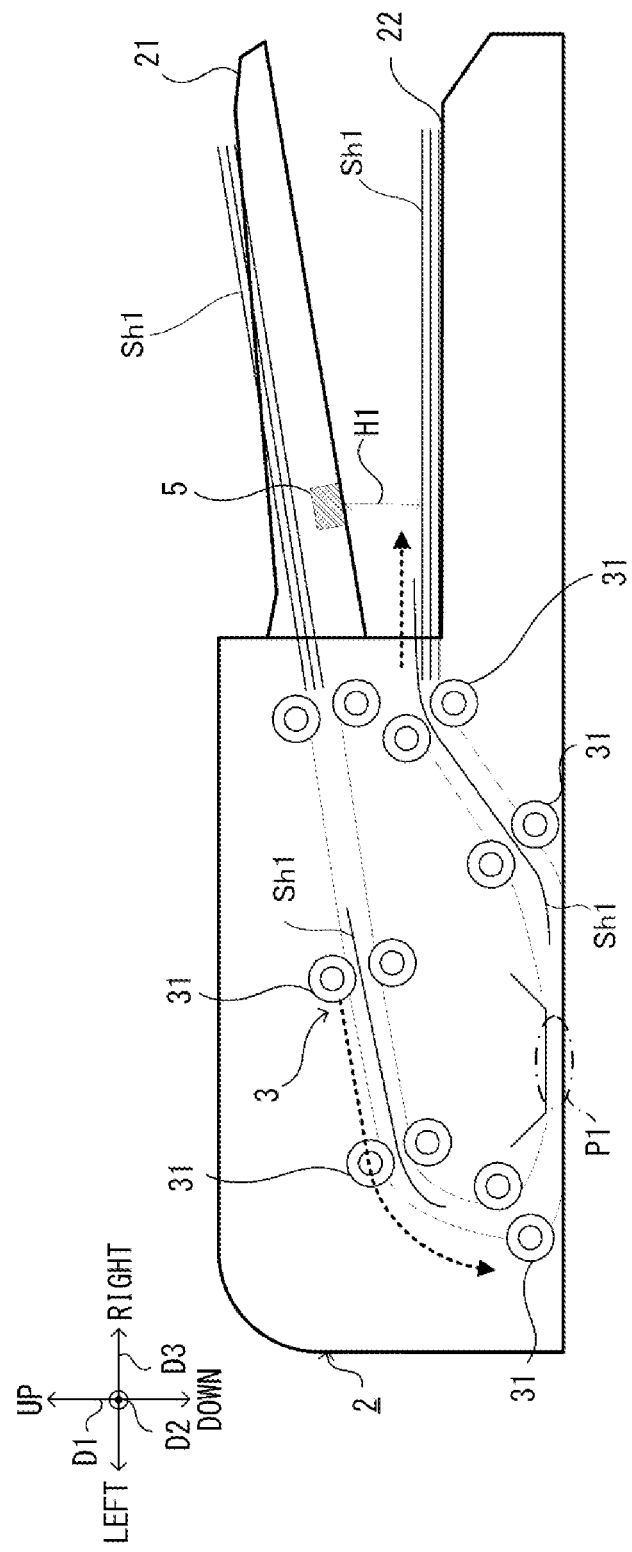
FIG. 3 is a schematic diagram showing an external appearance and an internal configuration of a sheet conveying device according to Embodiment 1.

As shown in FIG. 3, the conveyance mechanism 3 conveys a sheet Sh1 placed on the sheet placement table 21 onto the sheet discharge table 22 via the execution position P1. That is, the conveyance mechanism 3 conveys the sheet Sh1 from the sheet placement table 21 leftward and then downward as indicated by the dotted arrow in FIG. 3, turns back the sheet Sh1 to the right to pass through the execution position P1, and then discharges the sheet Sh1 onto the sheet discharge table 22. In other words, a conveyance path along which the sheet Sh1 is conveyed by the conveyance mechanism 3 includes the execution position P1 at which image processing by the image processing portion (in the present embodiment, image reading by the image reading portion 11) is executed.

For example, the conveyance mechanism 3 includes a plurality of conveyance rollers 31 and a power source. The conveyance mechanism 3 conveys sheets Sh1 set on the sheet placement table 21 one by one to the sheet discharge table 22 via the execution position P1 by driving the plurality of conveyance rollers 31 by the power of the power source that includes, for example, a motor. For example, in a state where a predetermined number of sheets Sh1 are set on the sheet placement table 21, the conveyance mechanism 3 conveys the predetermined number of sheets Sh1 one by one until all of the predetermined number of sheets Sh1 are discharged onto the sheet discharge table 22. This allows the predetermined number of sheets Sh1 as a job target to be moved from on the sheet placement table 21 onto the sheet discharge table 22 that is located below the sheet placement table 21.

The raising/lowering mechanism 4 is configured to raise and lower the sheet placement table 21. That is, the sheet placement table 21 is configured to be moved in the up-down direction D1 at least within a predetermined raising/lowering range. Specifically, the raising/lowering mechanism 4 is configured to switchably execute a raising operation and a lowering operation, wherein with the raising operation, the raising/lowering mechanism 4 moves up the sheet placement table 21 relative to the housing 100, and with the lowering operation, the raising/lowering mechanism 4 moves down the sheet placement table 21 relative to the housing 100. Furthermore, in a state of executing neither the raising operation nor the lowering operation, the raising/lowering mechanism 4 supports the sheet placement table 21 at an arbitrary position within the raising/lowering range.

In the present embodiment, an initial position is defined between an upper limit position (top dead center) and a lower limit position (bottom dead center) of the raising/lowering range, and at a normal time including a non-operation time of the image processing apparatus 10, the raising/lowering mechanism 4 supports the sheet placement table 21 at the initial position. Furthermore, the raising/lowering mechanism 4 is configured to move the sheet placement table 21 in a stepless manner in the up-down direction D1, and stop the sheet placement table 21 at an arbitrary position in the raising/lowering range. As a result, when the raising/lowering mechanism 4 performs a raising operation, it is possible to move the sheet placement table 21 from the initial position to an arbitrary position between the initial position and the upper limit position of the raising/lowering range. Conversely, when the raising/lowering mechanism 4 performs a lowering operation, it is possible to move the sheet placement table 21 from the initial position to an arbitrary position between the initial position and the lower limit position of the raising/lowering range.

Specifically, the raising/lowering mechanism 4 includes, for example: a mechanism portion such as a ball screw, a rack-pinion, and a pantograph; and a power source. The raising/lowering mechanism 4 moves the sheet placement table 21 straight along the up-down direction D1 by driving the mechanism portion by the power of the power source that includes, for example, a motor. Here, the raising/lowering mechanism 4 preferably has a sensor such as an encoder in the mechanism portion or the power source so as to have a function to detect the current position of the sheet placement table 21. This allows the raising/lowering mechanism 4 to raise and lower the sheet placement table 21 only within the raising/lowering range, and return it to the initial position. Furthermore, the raising/lowering mechanism 4 preferably has a function to detect a load applied to the output of the power source. With such a function, the raising/lowering mechanism 4 can stop or reversely move the sheet placement table 21 when, for example, a foreign matter (for example, a part of the body of a user) is caught during raising or lowering of the sheet placement table 21, and an overload acts.

It noted here that the raising/lowering mechanism 4 only needs to have a function to raise and lower the sheet placement table 21, and the above-described detailed configurations of the raising/lowering mechanism 4 are optional to the sheet conveying device 2. For example, moving the sheet placement table 21 in a stepless manner is not indispensable, but the sheet placement table 21 may be moved in a stepwise manner. In addition, defining the initial position within the raising/lowering range is not indispensable, but the raising/lowering mechanism 4 may always support the sheet placement table 21 at an arbitrary position. Furthermore, not limited to the configuration to move the sheet placement table 21 straight along the up-down direction D1, the raising/lowering mechanism 4 may, for example, raise and lower the sheet placement table 21 by rotating the sheet placement table 21 with an end (left end) of the sheet placement table 21 in the left-right direction D3 as a fulcrum.

As shown in FIG. 3, the ranging sensor 5 measures a height H1 that is a height from the sheet Sh1 on the sheet discharge table 22 to the sheet placement table 21. The ranging sensor 5 outputs the measurement result, namely, an electric signal corresponding to the height H1, to the control portion 15. The ranging sensor 5 is disposed on the lower surface side of the sheet placement table 21, and measures the height H1 that is a height from an upper surface of the sheet Sh1 discharged on the sheet discharge table 22 to a lower surface of the sheet placement table 21. That is, the height H1 measured by the ranging sensor 5 corresponds to a size of a gap between the lower surface of the sheet placement table 21 and the upper surface of the sheet Sh1. The larger the number of sheets Sh1 discharged onto the sheet discharge table 22 is, and for the same number of sheets Sh1, the larger the thickness of each sheet Sh1 is, the smaller (lower) the height H1 is, when the sheet placement table 21 is located at the same position. The ranging sensor 5 is, for example, a contactless sensor that uses reflection of light or ultrasonic waves.

Meanwhile, there is known, as a technology related to the sheet conveying device 2 of this type, a sheet conveying device that includes a sheet placement table and a sheet discharge table, wherein a sheet before image reading is placed on the sheet placement table, the sheet discharge table is disposed below the sheet placement table, and a sheet from which an image has been read is placed on the sheet discharge table. The sheet conveying device of the related technology includes a raising/lowering mechanism and a detection means, wherein the raising/lowering mechanism raises and lowers the sheet placement table so that a space between the sheet placement table and the sheet discharge table is widened, and the detection means detects whether or not a sheet is placed on the sheet discharge table. This sheet conveying device controls the raising/lowering operation of the sheet placement table based on the detection state of the detection means. In this sheet conveying device, when the detection means detects a sheet placed on the sheet placement table after a sheet reading operation is completed, the sheet placement table is raised, thereby enhancing visibility of the sheet on the sheet placement table and urging prevention of forgetting to take out the sheet from the sheet discharge table.

However, according to the configuration of the related technology, the raising amount of the sheet placement table is fixed, and a constant gap is formed between the sheet placement table and the sheet discharge table when the sheet placement table is raised. Accordingly, when, for example, the size of the sheet on the sheet placement table is relatively small, and the sheet is placed at a secluded location between the sheet placement table and the sheet discharge table, there may be a case where a hand of the user is difficult to reach the discharged sheet and the user is difficult to remove the sheet.

On the other hand, the present embodiment provides the sheet conveying device 2 and the image processing apparatus 10 that have a configuration described in the following to facilitate removal of the discharged sheet Sh1.

That is, the sheet conveying device 2 according to the present embodiment includes the sheet placement table 21, the sheet discharge table 22, the conveyance mechanism 3, the raising/lowering mechanism 4, and the raising/lowering control portion 23. The sheet discharge table 22 is located below the sheet placement table 21. The conveyance mechanism 3 conveys a sheet Sh1 placed on the sheet placement table 21 onto the sheet discharge table 22 via the execution position P1 at which the image processing is executed by the image processing portion. The raising/lowering mechanism 4 raises and lowers the sheet placement table 21. The raising/lowering control portion 23 controls the raising/lowering mechanism 4 to raise and lower the sheet placement table 21 to a target position that is determined in accordance with the size of the sheet Sh1 on the sheet discharge table 22. In the present embodiment, the raising/lowering control portion 23 that is a component of the sheet conveying device 2 is provided in the control portion 15 as a function of the control portion 15.

With the above-described configuration, the sheet conveying device 2 according to the present embodiment and the image processing apparatus 10 including the sheet conveying device 2 have an advantage that they facilitate removal of the discharged sheet Sh1. That is, the raising/lowering control portion 23 controls the raising/lowering mechanism 4 such that the sheet placement table 21 is raised or lowered to the target position that is determined in accordance with the size of the sheet Sh1 on the sheet discharge table 22. Accordingly, the raising amount (or lowering amount) of the sheet placement table 21 by the raising/lowering mechanism 4 is not fixed, and it is possible to raise the sheet placement table 21 to the target position that changes depending on the size of the sheet Sh1 on the sheet discharge table 22. As a result, the gap that is formed between the sheet placement table 21 and the sheet discharge table 22 when the sheet placement table 21 is raised is not constant, and it is possible to form an appropriate gap between the sheet placement table 21 and the sheet discharge table 22 in accordance with the size of the sheet Sh1 on the sheet discharge table 22. For example, when the size of the sheet Sh1 on the sheet discharge table 22 is relatively small, and the sheet Sh1 is placed at a secluded location between the sheet placement table 21 and the sheet discharge table 22, the sheet placement table 21 is raised to a relatively high position to form a large gap so that a hand of the user can easily reach the sheet Sh1. This facilitates for the user to remove the discharged sheet Sh1.

In short, in the present embodiment, the raising/lowering control portion 23 controls the raising/lowering mechanism 4 to raise or lower the sheet placement table 21 to the target position. Here, the "target position" is determined based on the size of the sheet Sh1 that has been conveyed by the sheet conveying device 2 and discharged on the sheet discharge table 22. That is, the target position is variable, and the target position changes as the size (paper size) of the sheet Sh1 on the sheet discharge table 22 changes. The raising/lowering control portion 23 controls the raising/lowering mechanism 4 to raise or lower the sheet placement table 21 so that the sheet placement table 21 is moved to the target position that is determined based on the size of the sheet Sh1. For example, when the sheet placement table 21 is located lower than the target position, the raising/lowering control portion 23 causes the raising/lowering mechanism 4 to perform the raising operation to move up (raise) the sheet placement table 21, and stops the raising/lowering mechanism 4 when the sheet placement table 21 reaches the target position. Conversely, when the sheet placement table 21 is located higher than the target position, the raising/lowering control portion 23 causes the raising/lowering mechanism 4 to perform the lowering operation to move down (lower) the sheet placement table 21, and stops the raising/lowering mechanism 4 when the sheet placement table 21 reaches the target position.

Here, the target position is defined by the height H1 that is a height from the sheet Sh1 on the sheet discharge table 22 to the sheet placement table 21. That is, in the present embodiment, the target position is not defined by an absolute position (height) of the sheet placement table 21, but is defined by a relative height of the sheet placement table 21 from the sheet Sh1 on the sheet discharge table 22. In other words, the target position is indicated by the position of the sheet placement table 21 (height H1) on the basis of the upper surface of the sheet Sh1 on the sheet discharge table 22. Specifically, the raising/lowering control portion 23 identifies the height H1 that is a height from the sheet Sh1 on the sheet discharge table 22 to the sheet placement table 21, based on an output of the ranging sensor 5, and defines the target position for the height H1. The raising/lowering control portion 23 then controls the raising/lowering mechanism 4 such that the measured height H1 matches the target position. For example, in a case where the target position is 30 mm, when the height H1 measured by the ranging sensor 5 is 10 mm, the raising/lowering control portion 23 moves up (raises) the sheet placement table 21 by 20 mm, and stops the raising/lowering mechanism 4 when the height H1 becomes the target position (30 mm).

With the above-described configuration, the raising/lowering mechanism 4 is controlled by the raising/lowering control portion 23, and the position of the sheet placement table 21 (target position) is not defined by an absolute position of the sheet placement table 21, but is defined by a relative height of the sheet placement table 21 from the sheet Sh1 on the sheet discharge table 22. Accordingly, it is possible to determine the relative height of the sheet placement table 21 from the sheet Sh1 on the sheet discharge table 22, in accordance with the size of the sheet Sh1 on the sheet discharge table 22. As a result, it is possible to form a gap between the lower surface of the sheet placement table 21 and the upper surface of the sheet Sh1 in accordance with the size of the sheet Sh1. This facilitates for the user to remove the discharged sheet Sh1.

Figure 4:
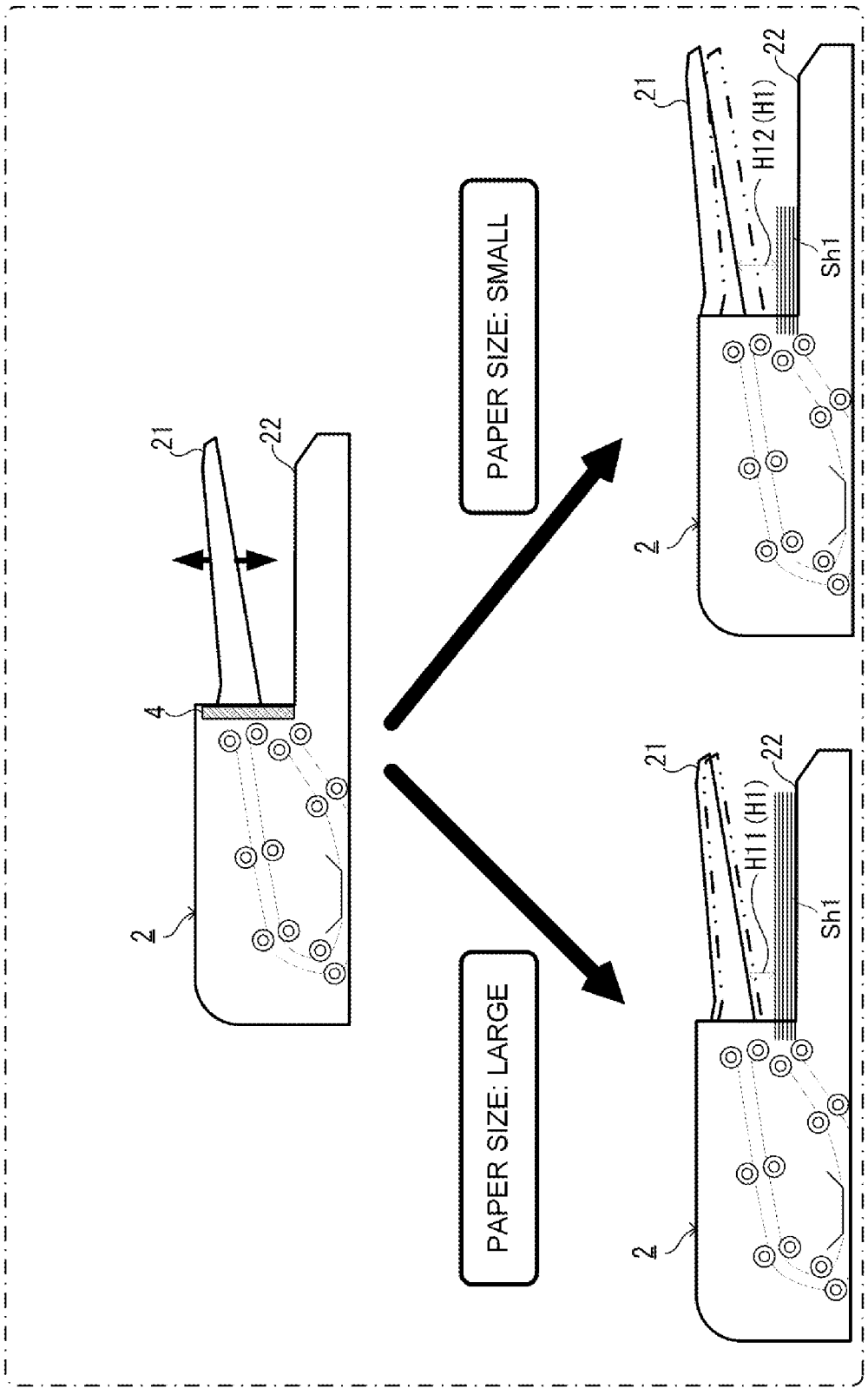
FIG. 4 is a schematic diagram showing an example of a raising/lowering operation of the sheet conveying device according to Embodiment 1.

Furthermore, in the present embodiment, the raising/lowering control portion 23 sets the target position to be higher as the sheet Sh1 on the sheet discharge table 22 is smaller. That is, the smaller the size of the sheet Sh1 on the sheet discharge table 22 is, the higher the target position is. Conversely, the larger the size of the sheet Sh1 on the sheet discharge table 22 is, the lower the target position is. In the present embodiment, the target position is defined by the height H1 that is a height from the sheet Sh1 to the sheet placement table 21. As a result, the smaller the size of the sheet Sh1 is, the larger (higher) the height H1 of the sheet placement table 21 from the upper surface of the sheet Sh1 on the sheet discharge table 22 is. In addition, the raising/lowering control portion 23 controls the raising/lowering mechanism 4 to raise or lower the sheet placement table 21 to the target position that is determined in accordance with the size of the sheet Sh1. As a result, for example, as shown in FIG. 4, the position of the sheet placement table 21 after the raising/lowering changes depending on the size of the sheet Sh1. In the example shown in FIG. 4, the left side shows the sheet placement table 21 after the raising/lowering when the size (paper size) of the sheet Sh1 is relatively "large", and the right side shows the sheet placement table 21 after the raising/lowering when the size of the sheet Sh1 is relatively "small". In both the left side and the right side of FIG. 4, the sheet placement table 21 before the raise is indicated by an imaginary line (two-dot chain line). As apparent therefrom, a height H12 that is a height of the sheet placement table 21 when the paper size is "small", is higher than a height H11 that is a height of the sheet placement table 21 when the paper size is "large" (H12>H11).

With the above-described configuration, when the size of the sheet Sh1 on the sheet discharge table 22 is relatively small, and the sheet Sh1 is placed at a secluded location between the sheet placement table 21 and the sheet discharge table 22, the sheet placement table 21 is raised to a relatively high position to form a large gap. As a result, even when the size of the sheet Sh1 on the sheet discharge table 22 is relatively small, a hand of the user easily reaches the sheet Sh1. This facilitates for the user to remove the discharged sheet Sh1.

Meanwhile, in a case where, as in the related technology, the raising amount of the sheet placement table is fixed, when the size of the sheet is relatively large, the sheet placement table may be raised more than necessary despite that the hand does not need to be inserted up to a secluded location between the sheet placement table and the sheet discharge table. In this case, it may be a problem that, for example, it takes time to return the sheet placement table to the initial position to read the next sheet (document sheet). On the other hand, in the sheet conveying device 2 according to the present embodiment, the sheet placement table 21 is moved to a relatively low position when the size of the sheet Sh1 is relatively large, thereby reducing the time required to return the sheet placement table to the initial position, for example, to read the next sheet Sh1 (document sheet).

In addition, in the present embodiment, the raising/lowering control portion 23 starts to control the raising/lowering mechanism 4 upon completion of execution of the image processing on all of the predetermined number of sheets Sh1 that are the job target. Here, the "job target" means a target of an image processing job. In addition, completion of execution of the image processing on all of the predetermined number of sheets Sh1 that are the job target corresponds to completion of the job (for example, the image reading). In the present embodiment, since the image processing executed on the sheet Sh1 is the image reading performed by the image reading portion 11, the control of the raising/lowering mechanism 4 is started upon completion of execution of the image reading on all of the predetermined number of sheets Sh1 that are the job target.

For example, in a case where 10 (ten) sheets Sh1 are set on the sheet placement table 21, when all of the 10 sheets Sh1 are discharged onto the sheet discharge table 22, it is determined that the image reading on all of the predetermined number of sheets Sh1 that are the job target is completed. Accordingly, after all of the 10 sheets Sh1 are discharged onto the sheet discharge table 22, the raising/lowering control portion 23 starts to control the raising/lowering mechanism 4 to raise or lower the sheet placement table 21 to the target position that is determined in accordance with the size of the sheet Sh1 on the sheet discharge table 22. With this configuration, it is possible to automatically raise or lower the sheet placement table 21 to the target position in correspondence with a timing when, after a job ends, the user removes, namely, takes out the sheet Sh1 on which the image processing (here, the image reading) has been performed, from on the sheet discharge table 22. Accordingly, the user can easily remove the discharged sheet Sh1 without an operation to raise or lower the sheet placement table 21.

The determination on whether or not execution of the image processing on all of the predetermined number of sheets Sh1 that are the job target is completed, may be made based on the operation state of the image processing portion (here, the image reading portion 11), or may be made in other ways. For example, when all sheets Sh1 have gone from on the sheet placement table 21, or when all sheets Sh1 have been discharged onto the sheet discharge table 22, it is determined that execution of the image processing on all of the predetermined number of sheets Sh1 that are the job target is completed.

In addition, since the raising/lowering mechanism 4 is configured to raise or lower the sheet placement table 21 within the raising/lowering range, the target position is determined such that the sheet placement table 21 is located within the raising/lowering range. However, for example, when the target position is set to be higher than the upper-limit position of the raising/lowering range, the raising/lowering control portion 23 may control the raising/lowering mechanism 4 to stop the sheet placement table 21 at the upper-limit position of the raising/lowering range.

The operation receiving portion 24 is configured to receive an operation performed by a user. The size of the sheet Sh1 on the sheet discharge table 22 is identified by the operation received by the operation receiving portion 24. That is, the operation receiving portion 24 is connected with, for example, the operation/display portion 14, and receives a user operation performed on the operation/display portion 14. The operation/display portion 14 may be an external device that is provided independently of the housing 100. In this case, the operation receiving portion 24 receives a user operation performed on the external device. In addition, the size of the sheet Sh1 on the sheet discharge table 22 based on which the target position is determined, is identified by the user operation received by the operation receiving portion 24. Accordingly, the raising/lowering control portion 23 determines the target position based on the size of the sheet Sh1 that has been specified by the user by performing an operation on the operation/display portion 14. With this configuration, there is no need to measure the size of the sheet Sh1, and it is possible to identify, without provision of a sensor or the like, the size of the sheet Sh1 on the sheet discharge table 22 based on which the target position is determined.

Specifically, the user specifies a "paper size" by performing an operation on the operation/display portion 14, wherein the "paper size" is the size of the sheet Sh1 that is the target of execution of the image processing. The raising/lowering control portion 23 identifies the size of the sheet Sh1 by the operation received by the operation receiving portion 24. In the present embodiment, the image processing performed on the sheet Sh1 is the image reading. Accordingly, when the size of the sheet Sh1 that is the target of the image reading is specified, the image reading is performed, and the size of the sheet Sh1 discharged onto the sheet discharge table 22 is identified. In addition, the raising/lowering control portion 23 determines the target position (height H1) based on the identified size (paper size) of the sheet Sh1.

Figures 5, 6:
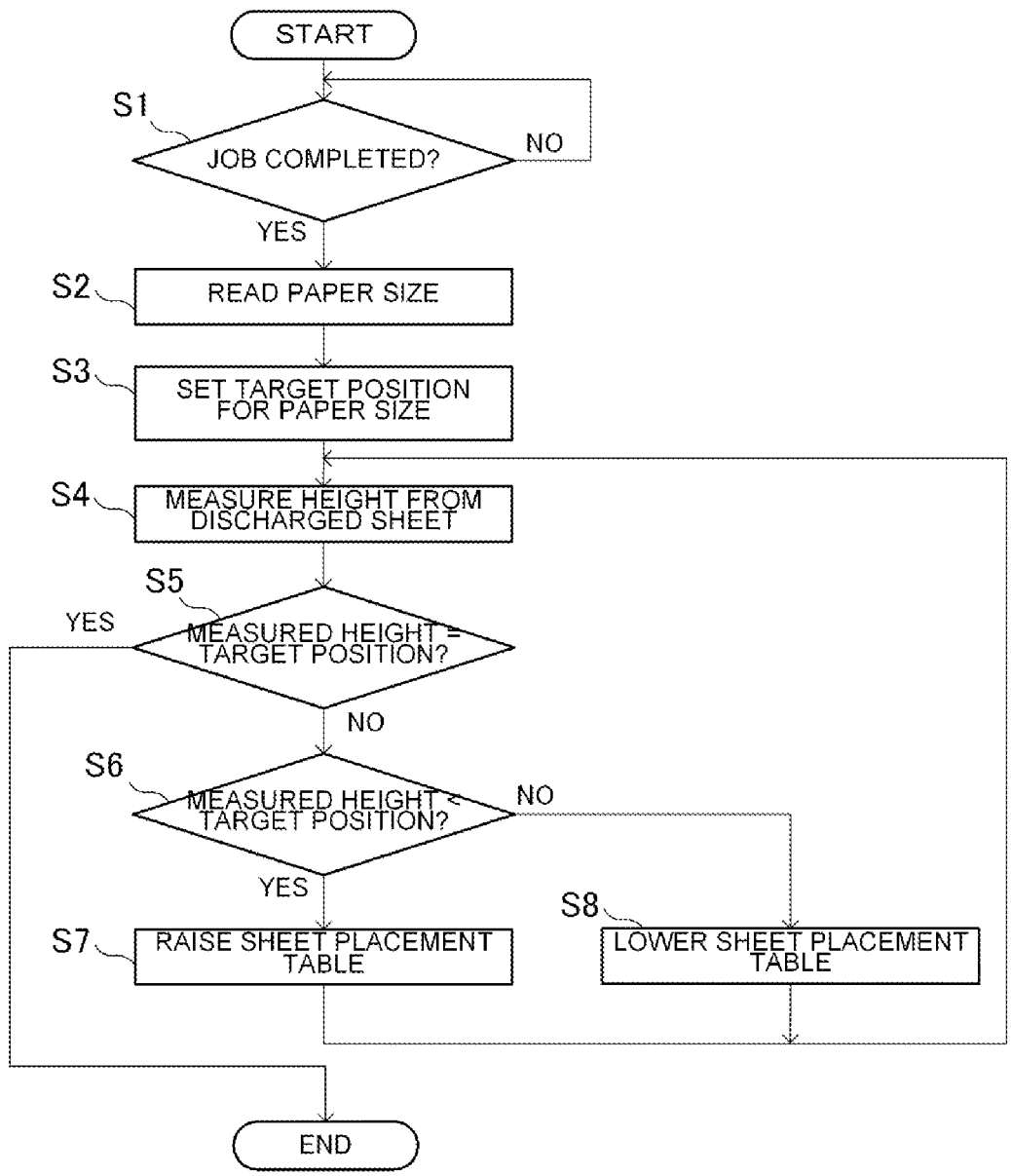
FIG. 5 is a diagram showing an example of a table used in the sheet conveying device according to Embodiment 1.
FIG. 6 is a flowchart showing an example of operation of the sheet conveying device according to Embodiment 1.

Here, the relationship between the size of the sheet Sh1 and the target position is defined by, for example, a table Ta1 shown in FIG. 5. In the table Ta1, various paper sizes, such as "A3E", "B4E", . . . "A6", and "business card", are each associated with a target position (in the present embodiment, the height H1 that is a height from the discharged sheet Sh1 to the sheet placement table 21). In the example shown in FIG. 5, target positions A [mm], B [mm], Y [mm], and Z [mm] that are respectively associated with "A3E", "B4E", . . . "A6", and "business card" become larger in the stated order (namely, A [mm] is the smallest, and Z [mm] is the largest). Such information (the table Ta1) indicating the relationship between the size of the sheet Sh1 and the target position is preliminarily stored in a storage portion or the like of the image processing apparatus 10. Accordingly, when the user specifies a paper size, the raising/lowering control portion 23 automatically applies a target position corresponding to the paper size.

It is noted that only upon completion of the job, the raising/lowering control portion 23 controls the raising/lowering mechanism 4 to raise or lower the sheet placement table 21 to the target position in accordance with the size of the sheet Sh1, and before completion of the job, the raising/lowering control portion 23 performs another control. That is, the raising/lowering control portion 23 only needs to have a sheet removal mode as an operation mode, wherein in the sheet removal mode, the raising/lowering control portion 23 performs the above-described control in preparation for removal of the sheet Sh1 from the sheet discharge table 22. The raising/lowering control portion 23 is configured to switch between the sheet removal mode and a normal mode. In the normal mode, for example, the raising/lowering control portion 23 controls the raising/lowering mechanism 4 to hold the sheet placement table 21 at the lower-limit position of the raising/lowering range when there is no sheet Sh1 on the sheet discharge table 22 and raise the sheet placement table 21 as the number of sheets Sh1 discharged onto the sheet discharge table 22 increases. With this configuration, it is possible to increase the number of sheets Sh1 that can be set on the sheet placement table 21 while restricting the height of the housing 100 (the sheet placement table 21).

[3] Sheet Conveying Method

Next, with reference to FIG. 6, the sheet conveying method according to the present embodiment, namely, an operation of the sheet conveying device 2, is described. Here, steps S1, S2, . . . in the flowchart shown in FIG. 6 represent numbers assigned to the processing procedures (steps) executed by the control portion 15 (mainly the raising/lowering control portion 23). The main configuration of the control portion 15 is a computer system that includes one or more processors and one or more memories. As a result, the following process is realized when the one or more processors execute a conveyance control program.

<Step S1>

First, in step S1, the raising/lowering control portion 23 determines whether or not the job is completed. That is, since the raising/lowering control portion 23 starts to control the raising/lowering mechanism 4 upon completion of execution of the image processing on all of the predetermined number of sheets Sh1 that are the job target, the raising/lowering control portion 23 first determines whether or not execution of the image processing on all of the predetermined number of sheets Sh1 that are the job target is completed. Upon determining that execution of the image reading on all of the predetermined number of sheets Sh1 that are the job target is completed, the raising/lowering control portion 23 determines that the job is completed (S1: Yes), and moves the process to step S2. On the other hand, upon determining that execution of the image reading on all of the predetermined number of sheets Sh1 that are the job target is not completed, the raising/lowering control portion 23 determines that the job is not completed (S1: No), and repeatedly executes step S1.

<Steps S2, S3>

In step S2, the raising/lowering control portion 23 reads a "paper size" specified by the user. That is, the user performs an operation on the operation/display portion 14 to specify the "paper size" indicating the size of the sheet Sh1 that is the target of execution of the image processing (here, the image reading), and the raising/lowering control portion 23 reads the "paper size" based on the operation received by the operation receiving portion 24 from the operation/display portion 14. Subsequently, in step S3, the raising/lowering control portion 23 consults the table Ta1 to read a target position corresponding to the read "paper size", and sets the target position corresponding to the paper size.

<Steps S4, S5>

In step S4, the raising/lowering control portion 23 identifies the height H1 that is a height from the sheet Sh1 on the sheet discharge table 22 to the sheet placement table 21, based on an output of the ranging sensor 5. Subsequently, the raising/lowering control portion 23 compares the measured height H1 with the target position. In step S5, the raising/lowering control portion 23 determines whether or not the measured height H1 (measured height) matches the target position. When the measured height H1 completely matches the target position, or when a difference between the measured height H1 and the target position is within an allowable range, the raising/lowering control portion 23 determines that the measured height matches the target position (S5: Yes), and ends the series of processes. On the other hand, when the difference between the measured height H1 and the target position is not within the allowable range, the raising/lowering control portion 23 determines that the measured height does not match the target position (S5: No), and moves the process to step S6.

<Step S6>

In step S6, the raising/lowering control portion 23 determines whether or not the measured height H1 (measured height) is smaller than the target position. The raising/lowering control portion 23 determines that the measured height H1 is smaller than the target position when the measured height H1 is lower (namely, lower in height) than the target position (S6: Yes), and moves the process step S7. On the other hand, the raising/lowering control portion 23 determines that the measured height H1 is not smaller than the target position when the measured height H1 is higher than the target position (S6: No), and moves the process step S8.

<Steps S7, S8>

In step S7, the raising/lowering control portion 23 causes the raising/lowering mechanism 4 to perform the raising operation to move up (raise) the sheet placement table 21. At this time, the raising/lowering control portion 23 may raise the sheet placement table 21 in a predetermined amount (for example, 1 mm) or continuously. On the other hand, in step S8, the raising/lowering control portion 23 causes the raising/lowering mechanism 4 to perform the lowering operation to move down (lower) the sheet placement table 21. At this time, the raising/lowering control portion 23 may lower the sheet placement table 21 in a predetermined amount (for example, 1 mm) or continuously. After step S7 or step S8, the raising/lowering control portion 23 moves the process to step S4. With such operations, the raising/lowering control portion 23 repeatedly controls the raising/lowering mechanism 4 to rase (S7) or lower (S8) the sheet placement table 21 until the measured height matches the target position, and stops the raising/lowering mechanism 4 when the measured height matches the target position (S5: Yes).

The above-described procedure of the sheet conveying method is only an example, and the order of the processes included in the flowchart of FIG. 6 may be appropriately changed, or some processes may be added to the flowchart.

[4] Modification

A plurality of components of the image processing apparatus 10 may be provided dispersedly in a plurality of housings. For example, the raising/lowering control portion 23 that is a component of the sheet conveying device 2 may not necessarily be realized as a function of the control portion 15, but may be provided in a housing that is different from a housing of the control portion 15. That is, the sheet conveying device 2 may not be integrated with the image processing apparatus 10, but at least a part of the sheet conveying device 2 may be provided in a housing that is different from a housing of the image processing apparatus 10.

In addition, the sheet conveyed by the sheet conveying device 2 may be the sheet Sh2 as a target of image forming by the image forming portion 12, namely, a sheet supplied by the sheet feed portion 13. In this case, for example, a manual feed tray of the sheet feed portion 13 corresponds to the sheet placement table of the sheet conveying device 2, and the sheet discharge tray 123 of the image forming portion 12 corresponds to the sheet discharge table of the sheet conveying device 2.

In addition, the size of the sheet Sh1 is not limited to any of regular sizes such as "A3E" or "B4E", but may be other than the regular sizes. In this case, the size of the sheet Sh1 can be defined by, for example, dimensions (lengths) of the sheet Sh1 in the lateral and longitudinal directions. Furthermore, in this case, the raising/lowering control portion 23 may calculate the target position, for example, based on the dimensions of the sheet Sh1 in the lateral and longitudinal directions, not based on the table Ta1.

In addition, it is not indispensable that the raising/lowering control portion 23 identifies the height H1 that is a height from the sheet Sh1 on the sheet discharge table 22 to the sheet placement table 21, based on an output of the ranging sensor 5. For example, the raising/lowering control portion 23 may estimate a total thickness of the sheets Sh1 on the sheet discharge table 22 based on: the number of sheets Sh1 on which the image processing is executed; and the thickness of each sheet Sh1, and may identify the height H1 from the absolute position of the sheet placement table 21 and the total thickness.

In addition, the target position may not be defined by the height H1 that is a height from the sheet Sh1 on the sheet discharge table 22 to the sheet placement table 21, but may be defined by the absolute position (height) of the sheet placement table 21. In addition, the raising/lowering control portion 23 is not limited to the configuration where the raising/lowering control portion 23 sets the target position to be higher as the sheet Sh1 on the sheet discharge table 22 is smaller. Instead, for example, basically the target position is constant, and the raising/lowering control portion 23 may change the target position only for the sheet Sh1 of a specific size such as the business card. Furthermore, the raising/lowering control portion 23 is not limited to the configuration where the raising/lowering control portion 23 starts to control the raising/lowering mechanism 4 upon completion of execution of the image processing on all of the predetermined number of sheets Sh1 that are the job target.

Embodiment 2

The image processing apparatus 10 according to the present embodiment differs from the image processing apparatus 10 according to Embodiment 1 in the means for identifying the size of the sheet Sh1 on the sheet discharge table 22. In the following description, the same components as those in Embodiment 1 are assigned the same reference signs, and description thereof is omitted as necessary.

In the present embodiment, the size of the sheet Sh1 on the sheet discharge table 22 based on which the target position is determined, is identified based on the real size of the sheet Sh1, not by an operation received by the operation receiving portion 24 (an operation to set the paper size). Specifically, the sheet conveying device 2 is provided with an appropriate sensor (including an image sensor) configured to measure the size of the sheet Sh1 on the sheet discharge table 22, and identifies the size of the sheet Sh1 on the sheet discharge table 22 based on an output of the sensor.

In a modification of the present embodiment, when the distance between the pair of cursors is adjusted in accordance with the size of the sheet Sh1 in the width direction, the size of the sheet Sh1 may be identified based on the distance between the pair of cursors. The configuration (including the modification) of Embodiment 2 is applicable in combination with the configuration (including the modification) of Embodiment 1.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet conveying device comprising:
   a sheet placement table;
   a sheet discharge table located below the sheet placement table;
   a conveyance mechanism configured to convey a sheet placed on the sheet placement table onto the sheet discharge table via an execution position at which image processing is executed by an image processing portion;
   a raising/lowering mechanism configured to raise and lower the sheet placement table; and
   a raising/lowering control portion configured to control the raising/lowering mechanism to raise and lower the sheet placement table to a target position that is determined in accordance with a size of the sheet on the sheet discharge table.

2. The sheet conveying device according to claim 1, further comprising:
   an operation receiving portion configured to receive an operation performed by a user, wherein
   the size of the sheet on the sheet discharge table is identified by the operation received by the operation receiving portion.

3. The sheet conveying device according to claim 1, wherein
   the raising/lowering control portion starts to control the raising/lowering mechanism upon completion of execution of the image processing on all of a predetermined number of sheets that are a job target.

4. The sheet conveying device according to claim 1, wherein
   the raising/lowering control portion sets the target position to be higher as the sheet on the sheet discharge table is smaller.

5. The sheet conveying device according to claim 1, wherein
   the target position is defined by a height from the sheet on the sheet discharge table to the sheet placement table.

6. An image processing apparatus comprising:
   the sheet conveying device according to claim 1; and the image processing portion configured to execute at least one of image reading and image forming on the sheet as a target.

7. The sheet conveying device according to claim 1, wherein
the target position is determined using information defining predetermined target positions for each of a plurality of predefined sheet sizes.

8. The sheet conveying device according to claim 1, wherein
the target position is calculated based on the size of the sheet on the sheet discharge table.

9. A sheet conveying method used in a sheet conveying device that includes:
a sheet placement table;
a sheet discharge table located below the sheet placement table;
a conveyance mechanism configured to convey a sheet placed on the sheet placement table onto the sheet discharge table via an execution position at which image processing is executed by an image processing portion; and
a raising/lowering mechanism configured to raise and lower the sheet placement table,
the sheet conveying method comprising
controlling the raising/lowering mechanism to raise and lower the sheet placement table to a target position that is determined in accordance with a size of the sheet on the sheet discharge table.

10. The method according to claim 9, wherein
the target position is determined using information defining predetermined target positions for each of a plurality of predefined sheet sizes.

11. The method according to claim 9, wherein
the target position is calculated based on the size of the sheet on the sheet discharge table.

* * * * *